April 18, 1961 J. H. ACHILICH 2,980,056
INSTRUMENT LIGHTING DEVICE
Filed March 8, 1954 2 Sheets-Sheet 1

INVENTOR
JOHN H. ACHILICH
BY
ATTORNEYS

April 18, 1961 J. H. ACHILICH 2,980,056
INSTRUMENT LIGHTING DEVICE
Filed March 8, 1954 2 Sheets-Sheet 2

INVENTOR
JOHN H. ACHILICH
BY
ATTORNEYS

United States Patent Office 2,980,056
Patented Apr. 18, 1961

2,980,056
INSTRUMENT LIGHTING DEVICE
John H. Achilich, Bethpage, N.Y., assignor to the United States of America as represented by the Secretary of the Navy Filed Mar. 8, 1954, Ser. No. 414,909
5 Claims. (Cl. 116—129)
(Granted under Title 35, U.S. Code (1952), sec. 266)

The invention described herein may be manufactured and used by or for the Government of the United States of America for governmental purposes without the payment of any royalties thereon or therefor.

This invention relates to an instrument lighting device and is adapted to provide uniform lighting for an instrument by means of a centrally applied source of illumination. The device represents improvements in central lighting over the lighting assembly disclosed in the U.S. Patent No. 2,772,651 of Gaetano Vincent Amico, for Integral Aircraft Instrument Lighting.

Instrument lighting has long presented a challenge to combine low level illumination with a minimum of reflection and light loss on the instrument panel. With increased night activity for motor vehicles, ships and aircraft, a satisfactory solution was needed. Many attempts were made to solve the problem.

One of the first systems used provided direct flood lighting. One such method required the use of self-luminous instrument pointers and dial markers. This was inadequate since the markings of radium paint could not be readily seen. To increase brightness, excitation with white or ultraviolet floodlighting was tried. But this did not permit fine control of the intensity of illumination and even worse, produced annoying reflections. Another method used orange fluorescent markings with excitation. While this process improved the illumination, the fluorescence is annoying and irritates the eyes. Where white or red floodlighting is provided a wider dimming range is possible, but uniformity of intensity and reduction or reflections are not avoided. A later system illuminated each instrument individually by indirect lighting. This may be carried out in several forms; such as using a false metal panel mounted in front of the instruments incorporating lamp assemblies, mounting edge-lighted plastic panels, or individual light shields. The latter which is used generally on aircraft instruments, incorporates two miniature bulbs on the upper section of the shield. These systems are inadequate because of their inflexibility and the non-uniformity of instrument illumination.

It has been determined that red flood lighting increases indicia brightness, but reduces contrast. Red light is generally used because of its preservation of dark adaptation of the eye.

The invention overcomes the inadequacies of the prior methods of illumination in employing a central lighting system capable of distributing illumination uniformly, with all information clearly visible, while presenting instrument information at low levels of illumination to achieve optimum dark adaptation. The brightness level is adjustable to meet varying conditions and involves no light loss from the instrument onto the instrument panel. Other advantages of the construction of the device of the invention reside in accessiblity and replacement of the lamp from the front of the instrument, and in that existing instruments may be used with the lighting system of the invention.

The primary object of the invention is to provide a method of lighting an instrument that encompasses the requirements necessary for dark adaptation by presenting the instrument information at low levels of illumination.

Another important object of the invention is to minimize the reflections and spillage of light by directing all of the light rays to the points that are to be illuminated, said direction providing the gathering of all of the light rays and transmitting them to the desired place.

Yet another important object of the invention is to provide a lamp assembly that is accessible at all times and is readily replaceable from the front of the instrument.

Still another object of the invention is to provide a uniform distribution of light whereby all of the information to be read is clearly visible.

And still another object of the invention is to provide lighting installation for each instrument individually, since in this manner the illumination for each instrument may be kept uniform and control of the brightness level is adjustable to provide adequate visibility under various conditions.

Yet another object of the invention is to apply the principles of the invention to instruments currently in use and thus reduce considerably the expense of modification needed to employ the improved structure.

A feature of the invention resides in the use of hermetically sealed housing for the lamp, the housing being constructed to channel light rays towards the instrument with no losses.

Another feature of the invention relates to the pointer construction whereby the light transmitted from the lamp is gathered by said pointer and is channeled along its entire length to utilize to a maximum such light.

More specifically, it is a feature of the invention to provide a prism cut in the body section of the pointer in order pick up the light passing through to transilluminate the pointer. It is a further feature to bevel the pointer at the point of light entry to pick up the light rays and bend them in order to transilluminate the entire pointer uniformly.

It is still a further feature to provide a light shield around the pointer to prevent radiation of light or light loss or reflections on to the dial, whereby illumination of the pointer is maintained at maximum efficiency.

And an additional feature resides in the use of highly reflecting media applied to the back and side edges of the instrument dial in order to increase the intensity of the transilluminated markings thereon.

Other objects and many of the attendant advantages of this invention will be readily appreciated as the same becomes better understood by reference to the following detailed description when considered in connection with the accompanying drawings wherein.

The description of specific embodiments of the invention will be related to aircraft instruments for uniformity, but it is to be understood that the inventive concept can be equally applied to instruments used in other sructions.

Figure 1:
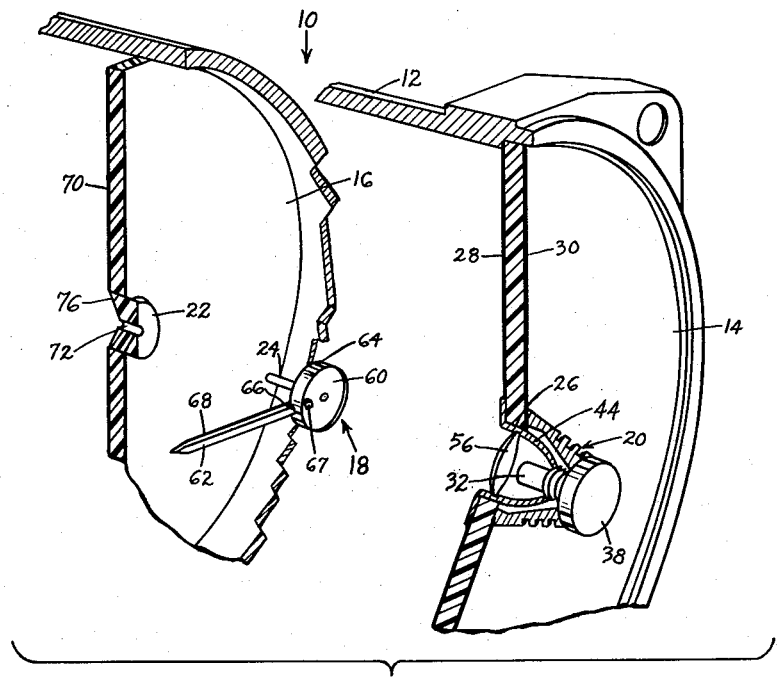
Fig. 1 is a perspective, exploded view of the instrument lighting device.
Figure 2:
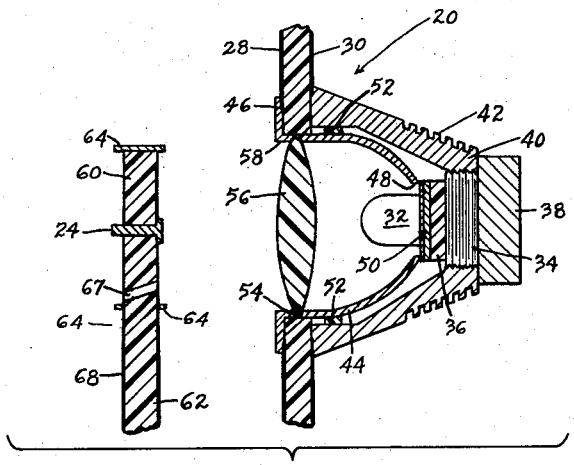
Fig. 2 is a vertical section of the lamp housing and a pointer of the invention.

Referring to Figures 1 and 2, a preferred form of the invention is illustrated as mounted in an altimeter 10.

Instrument 10 comprises a casing 12, a coated window 14 and a dial 16. A pointer 18 is mounted for rotation between the coated window and dial to indicate the altitude. Secured on the instrument window is a hermetically sealed lamp assembly 20 cooperating with the pointer and dial, as will presently appear, to provide low level illumination while preventing light reflection and avoiding loss of light intensity. As is more fully described in the above-mentioned copending application, window 14 is coated on each surface with a conductive coating so that current to light the lamp is provided with a minimum of extraneous wire and other media. Dial 16 is made of a clear transparent plastic, with an intermediate layer of white and a top layer of dull black plastic vinyl. The markings on the dial are cut through the black coat and partly into the intermediate white surface, but not completely through. Light then emerges only through the engraved indicia and numerals, the face of the dial remaining dark or dull black. This construction is also more fully described in the copending application. A prism 22 allows passage of the instrument handstaff pinion over which fits, telescopically, stem 24 attached to pointer 18.

Lamp mounting assembly 20 is mounted to extend through a central aperture 26 in the instrument window 14 and is hermetically sealed to prevent vapor condensation and corrosion of the instrument mechanism. Further, since the device is used with instruments that are under vacuum, it is necessary to hermetically seal them. The hermetically sealed lamp mounting assembly, allows the lamp to be replaced without venting the instrument.

Window 14 is coated with an electrically conductive material on each surface 28 and 30 as described in the copending application, permitting an electric current to be transmitted to the lamp 32. Lamp 32 is secured on a threaded shank or stem 34 having an insulated surface 36 between the shank and lamp 32. While any desired means to provide the current for lamp 32 is applicable, it is generally preferred to use the coated glass means described above. In this form, there is no obliteration of the dial markings, as electrical contact is established at the periphery of the window. Because of the resistance, heat is created over the entire window surface, thereby preventing condensation, an important factor in high altitude flight.

Lamp 32 is mounted in position by means of a brass or other metal housing 40 sealed or adhered to the outer surface of the window and is preferably colored a dull instrument black color. Fins 42 on the outer periphery of housing 40 dissipate the heat produced by the lamp, thereby materially prolonging the operating life of the lamp. Making up the other half of the lamp mounting assembly is a metal reflector 44, bell or dome-shaped in construction. Reflector 44 is provided with an outer annular flange 46 and is seated, or adhered to the inner face of the instrument window. Reflector 44 extends within housing 40 and is provided with an aperture 48, through which lamp 32 extends. Reflector 44 engages the metal surface of lamp 32 by means of a circular contactor 50 to complete the electrical circuit through the lamp from both sides of the conductive coated instrument window glass. This avoids the necessity of providing close tolerances of construction. Where cost of precision machining is not a factor, circular contactor 50 is omitted, and reflector 44 directly engages the surface of lamp 32.

Ordinarily, flanges 46 and housing 42 would be fused directly on the instrument window. In some instances, this would be undesirable. An annular locking sleeve 52, of compressible material and slightly tapered for convenience in insertion, is mounted on reflector 44. A bonding solution secures sleeve 52 to the reflector, and housing 40 is then slid over the sleeve until it is stopped at window 14. The bonding solution is also supplied on the outer surface of sleeve 52 and permanently seals the housing and reflector together. The compressed sleeve 52 is of non-conductive material to prevent shorting out of the lamp. The lamp assembly is thus rigidly held on the instrument window.

An annular groove 54 is provided on reflector 44 adjacent the flanged end and receives therein a lens 56, coated red. Lens 56 collects the rays of light emitted from lamp 32 to form parallel rays and thus allows the light rays from lamp 32 to be transmitted as parallel rays to pointer assembly 18. This will give red illuminated indicia the most satisfactory results for dark adaptation of the eye. The use of a lens increases the intensity of the available light. Where this is not material, an ordinary flat red filter may be substituted. Pointer assembly 18 extends behind flange 46 and in close proximity to lens 56. However, enough clearance is provided between the ring guard 64 on pointer assembly 18 and extension flange 58 on reflector 44 that free rotation of the pointer takes place. This type of construction further minimizes the possibility of a loss of light. Such design represents a materially improved construction of the bent pointers disclosed in the above mentioned U.S. patent, since it now permits the use of a straight pointer in close proximity to the light source and allows for transillumination of pointer and dial without light loss or reflections on the dial. This also solved the problem of case "stack-up," where the size and weight of the instrument had to be increased, now enabling the existing instrument to be used with a minimum of modification. In addition, needle 62 on pointer 18 could be uniformly and clearly transilluminated. The same results could be accomplished by placing a non-conductive ring inside flange 46, enabling light shield 64 to fit over flange 46 to prevent escape of light.

Pointer 18 preferably is of clear acrylic type plastic material and is one piece with the body plate portion 60 securing stem 24 and with the needle portion 62 coated matte white on the rear surface 68 to indicate in white for daylight viewing of the pointer. Plate portion 60 is clear and permits light to pass through to transilluminate the dial 16. Plate 60 is provided with a circular light shield 64 slotted at 66 to allow needle 62 to extend therethrough. A rectangular slot 67 is cut at an upward angle in plate portion 60 adjacent the pointer needle 62 at approximately 45° to bend light rays striking the sloped surface for travel through the length of the needle. The slot is highly polished, giving a prism effect which provides uniform transillumination of the pointer needle along its entire length. While a plastic pointer is used, it is obvious that any transparent material would carry out the principles of the invention.

Dial 16 is coated on its rear surface 70, with a mirror surfacing material, such as aluminum, or other reflecting means. The methods of application are conventional, and may be carried out by a deposit of materials through vacuum means, or by applying a thin foil of the reflecting material. By supplying the reflecting material directly on the dial, the conventional methods of adding a separate reflector of modified spherical cross-section behind the dial is avoided, and a substantial reduction in case "stack up" is effected.

Stem 24 on pointer 18 extends through an axial passageway 72 in prism 22 of dial 16. Prism 22 projects slightly beyond the face of the dial towards pointer assembly 18 so that the pointer is closely adjacent thereto, to further minimize any loss of light. Dial 16 is chamfered at 76 so that the beveled face angles from the axis towards the periphery of the dial. Light rays passing through the pointer are then deflected 90 degrees to the periphery of the dial to illuminate the dial markings. Reflector 44 aids in providing increased illumination intensity. In this manner, light is channeled from a central point to the pointer and to the instrument dial without the possibility of light rays escaping to the face of the dial. The use of a straight pointer, with the entire pointer surface transilluminated is now possible and the size and weight of the instrument are substantially reduced.

In this form of the invention, the lamp and the housing are mounted on the external surface of the instrument window. By not having any part of the lamp structure extend into the instrument, the pointer and dial can be brought close to the instrument window. However, where space-saving is a minor consideration, the entire lamp structure can be placed within the instrument. Such construction is illustrated in Figure 3 and in Figure 4.

Dome shaped housing 78 is entirely within the casing 80 of an instrument and is secured to window 82, as will presently be described. Pointer 84 is secured by shaft 86 to the instrument hand staff pinion 88 of the instrument. A dial with the required markings 90, and similar in construction to dial 16, is secured in the casing behind the pointer.

Dome 78 is of plastic, or other non-conducting, clear material, and incorporates a red filter in the bottom face. Dome 78 is cemented to a collar 92 secured on window 82. A second metallic collar 94 extends through the central aperture of window 82 and is internally threaded at 96 to receive lamp assembly 98. Collar 94 threads into collar 92 to secure the entire lamp assembly on the current conducting window 82. Contact for power to light the lamps is made through the coating and wire 100, as was previously described.

Figure 3:
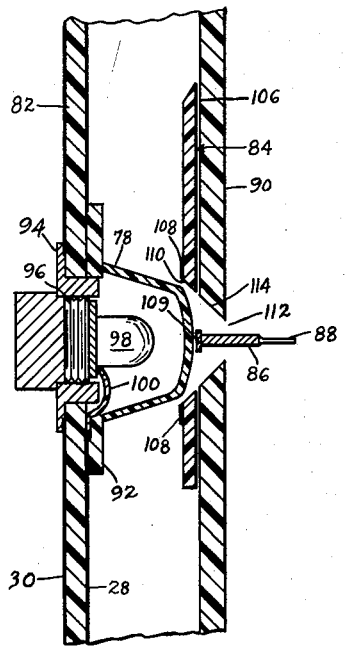
Fig. 3 is a vertical section of a second form of the instrument lighting device.
Figure 5:
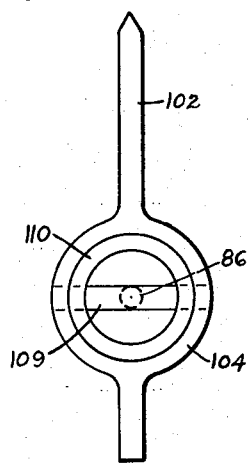
Fig. 5 is a vertical elevation of a modified form of the pointer.

Pointer 84 is straight in construction and is illustrated in detail in Figures 3 and 5. Pointer 84 comprises a needle member 102 of plastic and a ring-shaped body member 104 of plastic or other suitable material. Needle 102 is painted matte white on the under surface facing the front of the instrument and is overlayed with black paint to avoid reflections on the dial. Ring member 104 is painted black on both sides 108, for the same reason. A cross-piece 109, on ring 104, retains shaft 86, thereby enabling the pointer to turn. Ring 104 is beveled at 110 to allow the light rays to travel the length of needle 102. Dial disk 90 is centrally apertured at 112 to admit stem 86 and is beveled outwardly at 114 towards pointer 84 from the central aperture. The outer edge of bevel 114 terminates adjacent ring 104 and thus receives light passing through ring 104 for illumination on the face of the dial. Dial 90 is similar in construction to 16.

Figure 4:
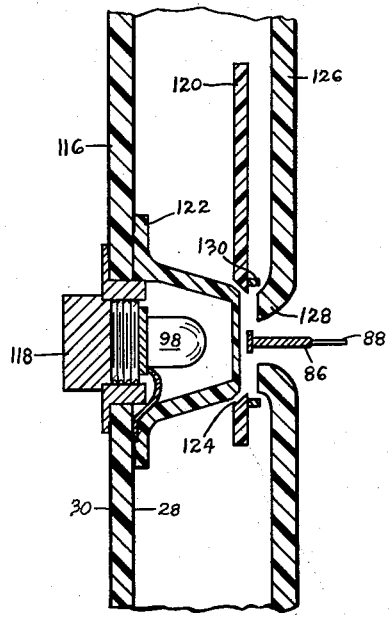
Fig. 4 is a vertical section of still another form of the instrument lighting device.

As is apparent from inspection of Figure 3, the outer edge of dome 78 is adjacent pointer 84. In some instances, it is desirable to channel the light rays closely into the pointer and dial. The modification of Figure 4 illustrates a construction designed to carry out these requirements.

Instrument window 116, lamp assembly 118 and pointer 120 have been described with respect to Figure 3. Dome 122 is modified with the apex of the dome beveled at 124 to allow the dome to be brought into close proximity in spaced, parallel relation with pointer 120. At the same time dial disk 126 is flanged at 128 towards the dome member to pick up light passing through the dome aperture and bending it 90 degrees along the vertical length of the dial. In all other respects, dial 126 is similar to dial 90. To prevent any escape of light rays, with the consequent undesired lighting up of the face of the dial, an annular disk or guard 130, of metal or black plastic, is mounted on the rear surface of pointer 120 to overlie in close proximity the flanged end of dial disk 126. Guard 130 prevents any light leakage onto the dial face and surrounding space and assures visibility of only the white markings on dial 126. Thus, light from lamp 118 is passed directly to pointer 120, which, by its beveled structure, uniformly lights the entire pointer, and also allows light to pass through the aperture in the pointer ring to be picked up by the flanged end of dial 126.

By the construction of the invention, it is readily apparent that the desired results have been accomplished. By the described methods of integral lighting, the main requirements necessary for dark adaptation, are attained. Low level illumination, a minimum of reflections, and a minimum of loss of light on the instrument panel, is achieved. In addition, conventional equipment can be used, with only slight modification. The hermetic dome structure allows the lamp to be retained therein and be easily replaced without venting the instrument case or disturbing the hermetic sealing of the instrument. The straight pointer with the prism obtained by the beveled construction, allows all of the light picked up by the prism to completely and uniformly illuminate the pointer. By the use of shielding means, no undesired lighting can occur. The central light mounting enables the bulb to be readily replaced from the front of the instrument. The dial, having a dull black background with the numerals and indicia in a matte white, allows the instrument dial to be clearly visible in daylight, and when used under conditions of darkness, is equally readily visible when transilluminated by the system.

Obviously many modifications and variations of the present invention are possible in the light of the above teachings. It is therefore to be understood that within the scope of the appended claims the invention may be practiced otherwise than as specifically described.

What is claimed is:

1. An instrument lighting device comprising, a casing, a window in said casing, a dial member secured in spaced relation to said window, a pointer of light transmitting material secured between said dial and window, and a lamp, a housing enclosing said lamp and secured to said window, said dial member having a coating on its back face, said pointer having a beveled edge in close proximity to said lamp to bend the light rays whereby the entire pointer is illuminated.

2. An instrument lighting device comprising, a casing, a window in said casing, a dial member secured in spaced relation to said window, a pointer of light transmitting material secured between said dial and window, and a lamp mounted in said window, said pointer having a beveled edge in close proximity to said lamp to bend the light rays whereby the entire pointer is illuminated, said dial member having a reflective coating on its back face, and a beveled edge on said dial member to form a prism to bend the light rays to uniformly illuminate the entire dial.

3. In an instrument lighting device comprising, a casing, a window in said casing, a dial member secured in spaced relation to said window, a pointer of light transmitting material secured between said dial and window, a lamp mounted in said window, and red filter means retained between said pointer and lamp, said pointer having a beveled edge in close proximity to said lamp to bend the light rays whereby the entire pointer is illuminated, said dial member having a reflective coating on its back face and also having a beveled edge to form a prism to bend the light rays to uniformly illuminate the entire dial.

4. An instrument lighting device comprising, a casing, a window in said casing, a dial member secured in spaced relation to said window, a pointer of light transmitting material secured between said dial and window, a lamp mounted in said window, and a housing enclosing said lamp and secured to said window, said pointer having a beveled edge in close proximity to said lamp to bend the light rays whereby the entire pointer is illuminated, said pointer including a needle secured between said dial member and window in close proximity to said lamp, and an inclined slot in said pointer adjacent to said dial member to deflect light rays to uniformly illuminate the needle, said dial member having a reflective coating on its back face and also having a beveled edge to form a prism to bend the light rays to uniformly illuminate the entire dial.

5. An instrument lighting device comprising, a casing, a window in said casing, a dial member secured in spaced relation to said window, a pointer of light transmitting material secured between said dial and window, a lamp mounted in said window, and a housing enclosing said lamp and secured to said window, said lamp including a reflector which extends into said housing, said pointer having a beveled edge in close proximity to said lamp to bend the light rays whereby the entire pointer is illuminated, said pointer including a needle secured between said dial member and window in close proximity to said lamp, and an inclined slot in said pointer adjacent to said dial member to deflect light rays to uniformly illuminate the needle, said dial member having a reflective coating on its back face and also having a beveled edge to form a prism to bend the light rays to uniformly illuminate the entire dial.

References Cited in the file of this patent

UNITED STATES PATENTS

| | | |
|---|---|---|
| 2,172,765 | Kollsman | Sept. 12, 1939 |
| 2,287,605 | Dickson | June 23, 1942 |
| 2,328,485 | Ott | Aug. 31, 1943 |
| 2,401,867 | Grimes | June 11, 1946 |
| 2,681,977 | Ballard | June 22, 1954 |
| 2,715,886 | Smith | Aug. 23, 1955 |
| 2,768,605 | Sturges | Oct. 30, 1956 |

FOREIGN PATENTS

| | | |
|---|---|---|
| 817,194 | France | May 24, 1937 |
| 827,715 | Germany | Jan. 14, 1952 |
| 474,407 | Italy | Sept. 23, 1952 |